United States Patent
Avudaiyappan et al.

(10) Patent No.: US 9,740,612 B2
(45) Date of Patent: *Aug. 22, 2017

(54) SYSTEMS AND METHODS FOR MAINTAINING THE COHERENCY OF A STORE COALESCING CACHE AND A LOAD CACHE

(75) Inventors: Karthikeyan Avudaiyappan, Sunnyvale, CA (US); Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/561,441

(22) Filed: Jul. 30, 2012

(65) Prior Publication Data

US 2014/0032856 A1    Jan. 30, 2014

(51) Int. Cl.
| | |
|---|---|
| G06F 12/08 | (2006.01) |
| G06F 12/0811 | (2016.01) |
| G06F 12/0815 | (2016.01) |
| G06F 12/0804 | (2016.01) |
| G06F 12/0897 | (2016.01) |
| G06F 12/12 | (2016.01) |

(52) U.S. Cl.
CPC ...... *G06F 12/0811* (2013.01); *G06F 12/0804* (2013.01); *G06F 12/0815* (2013.01); *G06F 12/0897* (2013.01); *G06F 12/12* (2013.01); *G06F 2212/1016* (2013.01); *G06F 2212/1032* (2013.01); *G06F 2212/1048* (2013.01); *G06F 2212/283* (2013.01); *G06F 2212/608* (2013.01)

(58) Field of Classification Search
CPC .. G06F 12/0815; G06F 12/08; G06F 12/0897; G06F 12/0804; G06F 12/12; G06F 2212/1048; G06F 2212/1016

USPC .............. 711/118, 122, 129, 141, 143, 169, 711/E12.024, E12.026
See application file for complete search history.

(56) References Cited

U.S. PATENT DOCUMENTS

| | | | |
|---|---|---|---|
| 4,075,704 A | 2/1978 | O'Leary | |
| 4,245,344 A | 1/1981 | Richter | |
| 4,356,550 A | 10/1982 | Katzman et al. | |
| 4,414,624 A | 11/1983 | Summer, Jr. et al. | |

(Continued)

FOREIGN PATENT DOCUMENTS

| | | |
|---|---|---|
| CN | 1305150 A | 7/2001 |
| EP | 0596636 | 5/1994 |

(Continued)

OTHER PUBLICATIONS

Techopedia, Cache Memory Definition, www.techopedia.com/definition/6307/cache-memory.*

(Continued)

*Primary Examiner* — Michael Krofcheck
(74) *Attorney, Agent, or Firm* — Nicholson De Vos Webster & Elliott LLP

(57) ABSTRACT

A method for maintaining the coherency of a store coalescing cache and a load cache is disclosed. As a part of the method, responsive to a write-back of an entry from a level one store coalescing cache to a level two cache, the entry is written into the level two cache and into the level one load cache. The writing of the entry into the level two cache and into the level one load cache is executed at the speed of access of the level two cache.

14 Claims, 5 Drawing Sheets

(56) References Cited

U.S. PATENT DOCUMENTS

| | | | |
|---|---|---|---|
| 4,524,415 A | 6/1985 | Mills, Jr. et al. |
| 4,527,237 A | 7/1985 | Frieder et al. |
| 4,577,273 A | 3/1986 | Hoppert et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,816,991 A | 3/1989 | Watanabe et al. |
| 4,920,477 A | 4/1990 | Colwell et al. |
| 5,294,897 A | 3/1994 | Notani et al. |
| 5,317,705 A | 5/1994 | Gannon et al. |
| 5,317,754 A | 5/1994 | Blandy et al. |
| 5,548,742 A | 8/1996 | Wang et al. |
| 5,559,986 A | 9/1996 | Alpert et al. |
| 5,574,878 A | 11/1996 | Onodera et al. |
| 5,581,725 A | 12/1996 | Nakayama |
| 5,634,068 A | 5/1997 | Nishtala et al. |
| 5,752,260 A | 5/1998 | Liu |
| 5,754,818 A | 5/1998 | Mohamed |
| 5,787,494 A | 7/1998 | DeLano et al. |
| 5,793,941 A | 8/1998 | Pencis et al. |
| 5,802,602 A | 9/1998 | Rahman et al. |
| 5,806,085 A | 9/1998 | Berliner |
| 5,813,031 A | 9/1998 | Chou et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,903,750 A | 5/1999 | Yeh et al. |
| 5,905,509 A * | 5/1999 | Jones et al. | 711/122 |
| 5,918,251 A | 6/1999 | Yamada et al. |
| 5,956,753 A | 9/1999 | Glew et al. |
| 5,974,506 A * | 10/1999 | Sicola et al. | 711/129 |
| 6,016,533 A | 1/2000 | Tran |
| 6,073,230 A | 6/2000 | Pickett et al. |
| 6,075,938 A | 6/2000 | Bugnion et al. |
| 6,088,780 A | 7/2000 | Yamada et al. |
| 6,092,172 A | 7/2000 | Nishimoto et al. |
| 6,101,577 A | 8/2000 | Tran |
| 6,115,809 A | 9/2000 | Mattson, Jr. et al. |
| 6,134,634 A * | 10/2000 | Marshall et al. | 711/143 |
| 6,138,226 A | 10/2000 | Yoshioka et al. |
| 6,157,998 A | 12/2000 | Rupley, II et al. |
| 6,167,490 A | 12/2000 | Levy et al. |
| 6,205,545 B1 | 3/2001 | Shah et al. |
| 6,212,613 B1 | 4/2001 | Belair |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,131 B1 | 7/2001 | Kikuta et al. |
| 6,260,138 B1 | 7/2001 | Harris |
| 6,272,662 B1 | 8/2001 | Jadav et al. |
| 6,275,917 B1 | 8/2001 | Okada |
| 6,321,298 B1 * | 11/2001 | Hubis | 711/124 |
| 6,332,189 B1 | 12/2001 | Baweja et al. |
| 6,341,324 B1 | 1/2002 | Caulk, Jr. et al. |
| 6,437,789 B1 | 8/2002 | Tidwell et al. |
| 6,449,671 B1 * | 9/2002 | Patkar et al. | 710/107 |
| 6,457,120 B1 | 9/2002 | Sinharoy |
| 6,557,083 B1 | 4/2003 | Sperber et al. |
| 6,594,755 B1 | 7/2003 | Nuechterlein et al. |
| 6,604,187 B1 | 8/2003 | McGrath et al. |
| 6,609,189 B1 | 8/2003 | Kuszmaul et al. |
| 6,658,549 B2 | 12/2003 | Wilson et al. |
| 6,681,395 B1 | 1/2004 | Nishi |
| 6,907,600 B2 | 6/2005 | Neiger et al. |
| 6,912,644 B1 | 6/2005 | O'Connor et al. |
| 7,007,108 B2 | 2/2006 | Emerson et al. |
| 7,111,145 B1 | 9/2006 | Chen et al. |
| 7,143,273 B2 | 11/2006 | Miller et al. |
| 7,149,872 B2 | 12/2006 | Rozas et al. |
| 7,213,106 B1 | 5/2007 | Koster et al. |
| 7,278,030 B1 | 10/2007 | Chen et al. |
| 7,380,096 B1 | 5/2008 | Rozas et al. |
| 7,406,581 B2 | 7/2008 | Southwell |
| 7,546,420 B1 | 6/2009 | Shar et al. |
| 7,680,988 B1 | 3/2010 | Nickolls et al. |
| 7,783,868 B2 | 8/2010 | Ukai |
| 7,856,530 B1 | 12/2010 | Mu |
| 7,913,058 B2 | 3/2011 | Rozas et al. |
| 8,145,844 B2 | 3/2012 | Bruce |
| 8,239,656 B2 | 8/2012 | Rozas et al. |
| 8,301,847 B2 | 10/2012 | Dantzig et al. |
| 8,522,253 B1 | 8/2013 | Rozas et al. |
| 8,868,838 B1 | 10/2014 | Glasco et al. |
| 8,930,674 B2 | 1/2015 | Avudaiyappan et al. |
| 9,047,178 B2 | 6/2015 | Talagala et al. |
| 2001/0049782 A1 | 12/2001 | Hsu et al. |
| 2002/0069326 A1 * | 6/2002 | Richardson et al. | 711/140 |
| 2002/0082824 A1 | 6/2002 | Neiger et al. |
| 2002/0099913 A1 * | 7/2002 | Steely, Jr. | 711/141 |
| 2003/0065887 A1 | 4/2003 | Maiyuran et al. |
| 2003/0088752 A1 | 5/2003 | Harman |
| 2004/0034762 A1 | 2/2004 | Kacevas |
| 2004/0044850 A1 | 3/2004 | George et al. |
| 2004/0064668 A1 | 4/2004 | Kjos et al. |
| 2004/0093483 A1 | 5/2004 | Nguyen et al. |
| 2004/0103251 A1 | 5/2004 | Alsup |
| 2004/0117593 A1 | 6/2004 | Uhlig et al. |
| 2004/0117594 A1 | 6/2004 | Vanderspek |
| 2004/0143727 A1 | 7/2004 | McDonald |
| 2004/0193857 A1 | 9/2004 | Miller et al. |
| 2004/0205296 A1 * | 10/2004 | Bearden | 711/129 |
| 2004/0215886 A1 | 10/2004 | Cargnoni et al. |
| 2004/0225872 A1 | 11/2004 | Bonanno et al. |
| 2005/0005085 A1 | 1/2005 | Miyanaga |
| 2005/0027961 A1 | 2/2005 | Zhang |
| 2005/0060457 A1 | 3/2005 | Olukotun |
| 2005/0108480 A1 | 5/2005 | Correale et al. |
| 2005/0154867 A1 | 7/2005 | DeWitt et al. |
| 2006/0004964 A1 | 1/2006 | Conti et al. |
| 2006/0026381 A1 | 2/2006 | Doi et al. |
| 2006/0190707 A1 | 8/2006 | McIlvaine et al. |
| 2006/0236074 A1 | 10/2006 | Williamson et al. |
| 2006/0277365 A1 * | 12/2006 | Pong | 711/128 |
| 2008/0077813 A1 | 3/2008 | Keller et al. |
| 2008/0091880 A1 * | 4/2008 | Vishin | 711/122 |
| 2008/0126771 A1 | 5/2008 | Chen et al. |
| 2008/0195844 A1 | 8/2008 | Shen et al. |
| 2008/0215865 A1 | 9/2008 | Hino et al. |
| 2008/0235500 A1 | 9/2008 | Davis et al. |
| 2008/0270758 A1 | 10/2008 | Ozer et al. |
| 2008/0270774 A1 | 10/2008 | Singh et al. |
| 2008/0282037 A1 | 11/2008 | Kusachi et al. |
| 2009/0138659 A1 | 5/2009 | Lauterbach |
| 2009/0157980 A1 * | 6/2009 | Bruce | 711/141 |
| 2009/0158017 A1 | 6/2009 | Mutlu et al. |
| 2009/0164733 A1 | 6/2009 | Kim et al. |
| 2009/0172344 A1 | 7/2009 | Grochowski et al. |
| 2009/0287912 A1 | 11/2009 | Sendag |
| 2010/0138607 A1 * | 6/2010 | Hughes et al. | 711/121 |
| 2010/0169578 A1 | 7/2010 | Nychka et al. |
| 2010/0169611 A1 | 7/2010 | Chou et al. |
| 2010/0211746 A1 * | 8/2010 | Tsukishiro | 711/143 |
| 2011/0010521 A1 | 1/2011 | Wang et al. |
| 2011/0082980 A1 | 4/2011 | Gschwind et al. |
| 2011/0082983 A1 | 4/2011 | Koktan |
| 2011/0153955 A1 | 6/2011 | Herrenschmidt et al. |
| 2012/0005462 A1 | 1/2012 | Hall et al. |
| 2012/0042126 A1 | 2/2012 | Krick et al. |
| 2013/0019047 A1 | 1/2013 | Podvalny et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0238874 A1 | 9/2013 | Avudaiyappan et al. |
| 2013/0304991 A1 | 11/2013 | Boettcher et al. |
| 2013/0311759 A1 | 11/2013 | Abdallah |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |

(56) References Cited

U.S. PATENT DOCUMENTS

| | | |
|---|---|---|
| 2014/0032856 A1 | 1/2014 | Avudaiyappan et al. |
| 2014/0075168 A1 | 3/2014 | Abdallah |
| 2014/0108730 A1 | 4/2014 | Avudaiyappan et al. |
| 2014/0156947 A1 | 6/2014 | Avudaiyappan et al. |
| 2014/0281242 A1 | 9/2014 | Abdallah et al. |
| 2016/0041908 A1 | 2/2016 | Avudaiyappan et al. |
| 2016/0041913 A1 | 2/2016 | Avudaiyappan et al. |
| 2016/0041930 A1 | 2/2016 | Avudaiyappan et al. |

FOREIGN PATENT DOCUMENTS

| | | |
|---|---|---|
| EP | 0706133 | 4/1996 |
| GB | 2343270 A | 5/2000 |
| TW | 200707284 | 3/1995 |
| TW | 539996 B | 7/2003 |
| TW | 200401187 A | 1/2004 |
| TW | 591530 B | 6/2004 |
| TW | I233545 B | 6/2005 |
| TW | I281121 B | 5/2007 |
| WO | 0125921 | 4/2001 |

OTHER PUBLICATIONS

Barham et al., "Xen and the Art of Virtualization," ACM Symposium on Operating Systems Principles, Oct. 19, 2003, pp. 164-177.
Gene Cooperman, Cache Basics, 2003, http://www.ccs.neu.edu/course/com3200/parent/Notes/cache-basics.html, pp. 1-3.
Final Office Action from U.S. Appl. No. 13/561,491, dated Jan. 14, 2015, 14 pages.
Final Office Action from U.S. Appl. No. 13/561,491, dated Nov. 12, 2014, 14 pages.
Final Office Action from U.S. Appl. No. 13/561,491, dated Oct. 13, 2015, 16 pages.
Final Office Action from U.S. Appl. No. 13/561,528, dated Nov. 10, 2014, 19 pages.
Final Office Action from U.S. Appl. No. 14/173,602, dated Jan. 8, 2016, 32 pages.
Final Office Action from U.S. Appl. No. 14/173,602, dated Jan. 9, 2017, 18 pages.
Final Office Action from U.S. Appl. No. 14/922,035, dated Oct. 14, 2016, 29 pages.
Final Office Action from U.S. Appl. No. 14/922,042, dated Oct. 14, 2016, 15 pages.
Final Office Action from U.S. Appl. No. 14/922,053, dated Oct. 14, 2016, 16 pages.
Garmany J., "The Power of Indexing," archieved on Mar. 9, 2009, 7 pages.
International Preliminary Report on Patentability for Application No. PCT/US2013/051128, dated Feb. 12,2015, 8 pages.
International Search Report and Written Opinion for Application No. PCT/US2013/051128, dated Oct. 30, 2013, 9 pages.
Jacobson et al., "Path-based Next Trace Prediction," IEEE, 1997, pp. 14-23.
Nanda A.K., et al., "The Misprediction Recovery Cache," International Journal of Parallel Programming, Plenum Publishing Corporation, 1998, vol. 26 (4), pp. 383-415.
Non-Final Office Action from U.S. Appl. No. 13/561,491, dated Feb. 8, 2016, 16 pages.
Non-Final Office Action from U.S. Appl. No. 13/561,491, dated Jun. 16, 2014, 13 pages.
Non-Final Office Action from U.S. Appl. No. 13/561,491, dated May 5, 2015, 15 pages.
Non-Final Office Action from U.S. Appl. No. 13/561,528, dated Dec. 19, 2014, 13 pages.
Non-Final Office Action from U.S. Appl. No. 13/561,528, dated Jun. 17, 2014 , 11 pages.
Non-Final Office Action from U.S. Appl. No. 14/173,602, dated Jul. 29, 2016, 19 pages.
Non-Final Office Action from U.S. Appl. No. 14/173,602, dated Sep. 8, 2015, 32 pages.
Non-Final Office Action from U.S. Appl. No. 14/922,035, dated Jun. 21, 2016, 13 pages.
Non-Final Office Action from U.S. Appl. No. 14/922,042, dated Apr. 7, 2016, 16 pages.
Non-Final Office Action from U.S. Appl. No. 14/922,042, dated Dec. 14, 2016, 20 pages.
Non-Final Office Action from U.S. Appl. No. 14/922,053, dated Apr. 7, 2016, 15 pages.
Non-Final Office Action from U.S. Appl. No. 14/922,053, dated Dec. 15, 2016, 16 pages.
Notice of Allowance from U.S. Appl. No. 13/561,491, dated Dec. 19, 2016, 13 pages.
Notice of Allowance from U.S. Appl. No. 13/561,491, dated Jun. 8, 2016, 12 pages.
Notice of Allowance from U.S. Appl. No. 13/561,491, dated Sep. 14, 2016, 18 pages.
Notice of Allowance from U.S. Appl. No. 13/561,528, dated Aug. 3, 2016, 6 pages.
Notice of Allowance from U.S. Appl. No. 13/561,528, dated Feb. 8, 2016, 15 pages.
Notice of Allowance from U.S. Appl. No. 13/561,528, dated Jul. 13, 2015, 14 pages.
Notice of Allowance from U.S. Appl. No. 13/561,528, dated Mar. 31, 2015, 5 pages.
Notice of Allowance from U.S. Appl. No. 13/561,528, dated May 2, 2016, 10 pages.
Notice of Allowance from U.S. Appl. No. 13/561,528, dated Oct. 21, 2015, 9 pages.
Notice of Allowance from U.S. Appl. No. 13/561,570, dated Aug. 27, 2015, 9 pages.
Notice of Allowance from U.S. Appl. No. 13/561,570, dated Dec. 7, 2015, 7 pages.
Notice of Allowance from U.S. Appl. No. 13/561,570, dated Jan. 29, 2015, 9 pages.
Notice of Allowance from U.S. Appl. No. 13/561,570, dated Jun. 20, 2014, 8 pages.
Notice of Allowance from U.S. Appl. No. 13/561,570, dated May 20, 2015, 3 pages.
Notice of Allowance from U.S. Appl. No. 13/561,570, dated Oct. 22, 2014, 16 pages.
Rotenberg E., et al.,"Trace Cache: a Low Latency Approach to High Bandwidth Instruction Fetching," Apr. 11, 1996, 48 pages.
Wallace S., et al.,"Multiple Branch and Block Prediction," Third International symposium on High-Performance Computer Architecture, IEEE, Feb. 1997, pp. 94-103.
Ye J., et al.,"A New Recovery Mechanism in Superscalar Microprocessors by Recovering Critical Misprediction,"IEICE Transactions on Fundamentals of Electronics, Communications and Computer Sciences, 2011, vol. E94-A (12), pp. 2639-2648.
Yeh T., et al.,"Increasing the Instruction Fetch Rate Via Multiple Branch Prediction and a Branch Address Cache," 7th International Conference on Supercomputing, ACM, 1993, pp. 67-76.
Notice of Allowance from U.S. Appl. No. 14/922,035, dated Jan. 27, 2017, 5 pages.

* cited by examiner

SYSTEMS AND METHODS FOR MAINTAINING THE COHERENCY OF A STORE COALESCING CACHE AND A LOAD CACHE

A cache in a central processing unit is a data storage structure that is used by the central processing unit of a computer to reduce the average time that it takes to access memory. It is a memory which stores copies of data that is located in the most frequently used main memory locations. Moreover, cache memory is memory that is smaller and that may be accessed more quickly than main memory. There are several different types of caches.

In computing, cache coherence refers to the consistency of data stored in local caches of a shared resource. In a shared memory system that includes separate cache memory components, it is possible to have many copies of data: one copy in the main memory and one in one or more cache memory components. When one copy of data stored in the cache system is changed, the other copies of the data must be changed also. Cache coherence ensures that changes in the values of shared data are propagated throughout a cache system in a timely fashion. A cache system is coherent if whenever data is read, the returned value for the data is the value that is most recently written.

A coherency protocol is a protocol which maintains consistency between all the caches in a system of distributed shared memory. The protocol maintains memory coherence according to a specific consistency model. Choosing the appropriate consistency model is critical to the design of a cache coherent system. However, consistency models differ in performance and scalability. Accordingly, they should be evaluated for every cache system design for which they are considered. Designers can add features to address particular challenges presented by specific designs. Consequently, a challenge of cache system design is implementing a protocol to have features that best suit the specific design of the cache system in which it is used.

SUMMARY

A challenge of cache system design is implementing a protocol to have features that best suit the design of the cache system. A method for maintaining consistency between a level one store coalescing cache and a level one load cache is disclosed that includes such features. However, the claimed embodiments are not limited to implementations that address any or all of the aforementioned shortcomings. In one embodiment, loads access both the store coalescing cache and the load cache and stores do not write into the load cache. If a load access hits in the store coalescing cache, a load is able to secure both a possibly stale copy of data from the load cache and the latest copy of data from the store coalescing cache and consume the latest copy. Consequently, the copy of data for an address in the load cache can remain stale as long as the latest copy of the data for that address is also present in the store coalescing cache. When the store coalescing cache is no longer able to maintain the address and its data therein, a write-back of the address and data to the level two cache is executed. This write-back from the store coalescing cache updates both the level two cache and the load cache as part of a single continuous transaction. In one embodiment, the address and its data is written into the level two cache and into the level one load cache at the speed of access of the level two cache. Moreover, the writing of the entry into the level two cache and into the load cache is executed at the speed of access of the level two cache. As such, the load cache is kept coherent with the store coalescing cache at the time of write-back.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
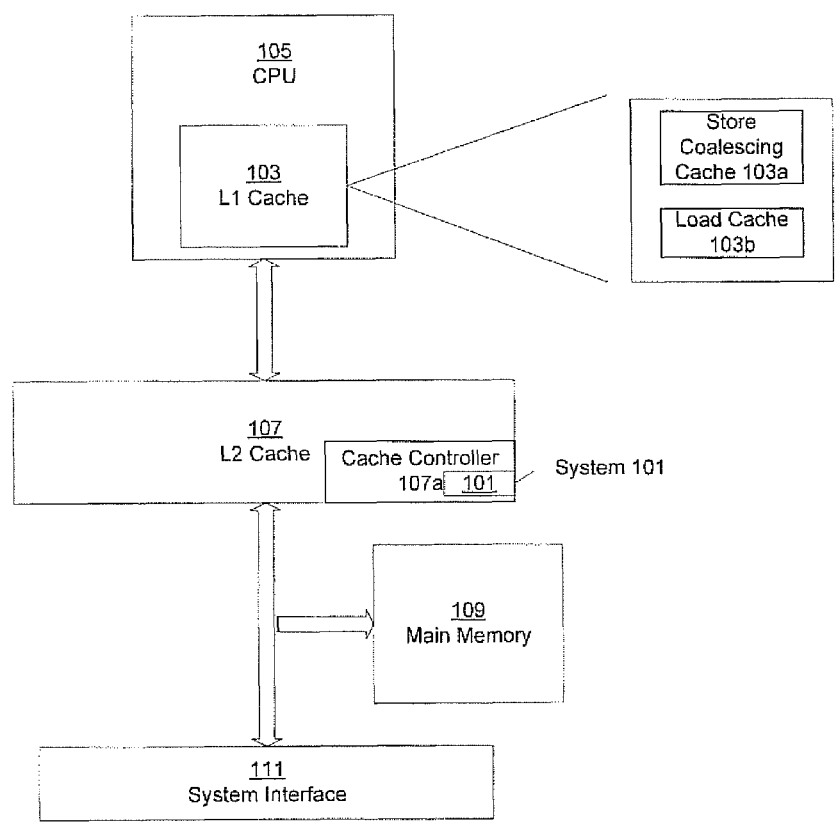
FIG. 1A shows an exemplary operating environment of a system for maintaining the coherency of a store coalescing cache and a load cache at the time of write-back according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "searching" or "identifying" or "providing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of a System for Maintaining the Coherency of a Store Coalescing Cache and a Load Cache According to One Embodiment FIG. 1A shows an exemplary operating environment 100 of a system 101 for maintaining the coherency of a store coalescing cache and a load cache at the time of write-back according to one embodiment. System 101 enables, in response to a request to write-back data from a level one store coalescing cache to a level two cache, a writing of the data to a level two cache and to a level one load cache. Consequently, a level one load only cache is kept coherent with a level one store only cache at the time of write-back. FIG. 1A shows system 101, L1 cache 103, L1 store coalescing cache 103a, L1 load cache 103b, CPU 105, L2 cache 107, L2 cache controller 107a, main memory 109 and system interface 111.

Figure 1B:
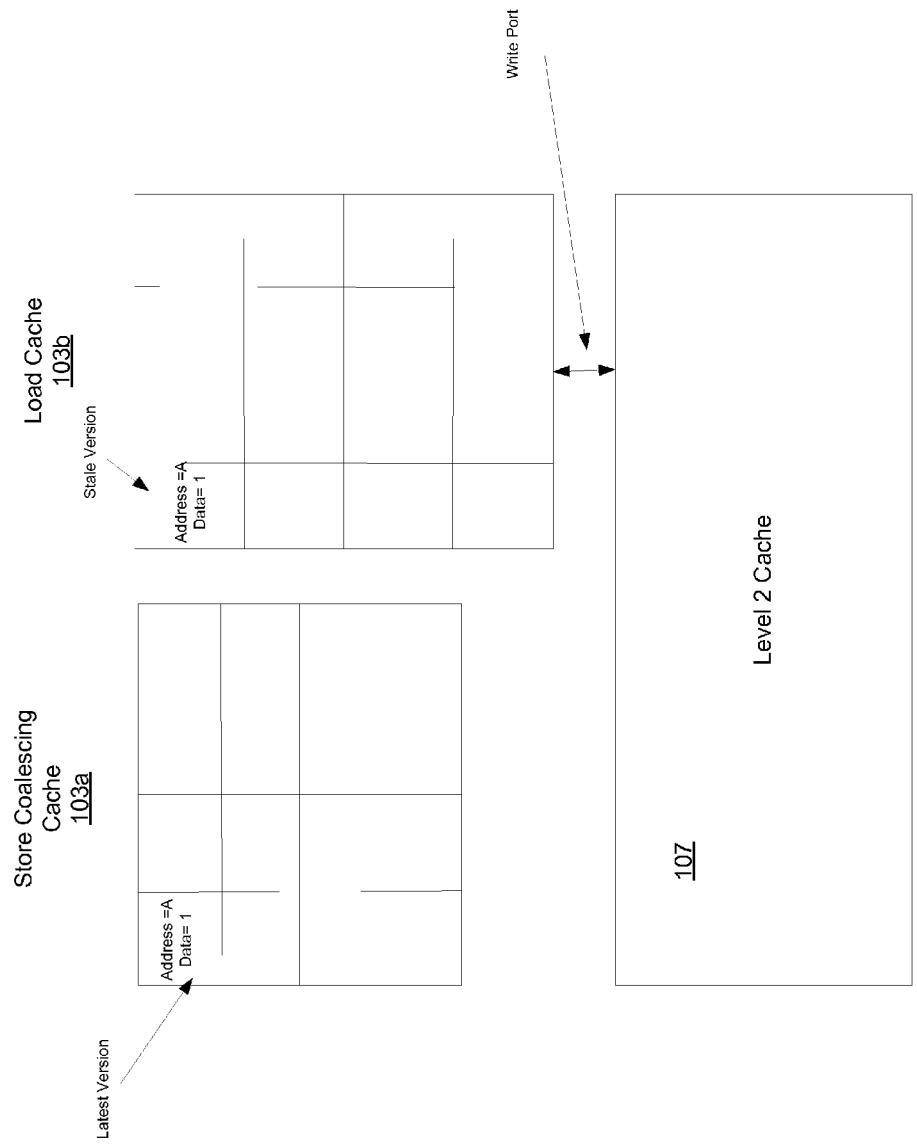
FIG. 1B shows a level one cache that is configured to include two separate cache portions according to one embodiment.

Referring FIG. 1A, L1 cache 103 is a level one cache and L2 cache 107 is a level two cache. In one embodiment, the contents of L1 cache 103 are not included in L2 cache 107. In one embodiment, L1 cache 103 can be a part of CPU 105. As is shown in FIG. 1B, in one embodiment, level one cache 103 is configured to include two separate cache portions, store coalescing cache 103a and load cache 103b. Load cache 103b has a single write port (see FIG. 1B) which is under the control of L2 cache 107. In one embodiment, this write port becomes available for writing data to load cache 103b during write-back operations. Load cache 103b maintains entries that are accessed by load requests and store coalescing cache 103a maintains entries that are accessed by store requests. In one embodiment, the separation of level one cache 103, as described above, into caches exclusively for loads and stores enables the accommodation of a throughput of a plurality of loads and stores in a single clock cycle.

In one embodiment, stores that update entries in store coalescing cache 103a may not update copies of the entries that are maintained in load cache 103b. Accordingly, in one embodiment, at the time of a request to write-back a data entry that resides in store coalescing cache 103a, a corresponding data entry that is then present in load cache 103b can be stale. In one embodiment, when this occurs, requests to replace data in store coalescing cache 103a are used to trigger the writing of L2 cache 107 to include the entry that is to be replaced in store coalescing cache 103a as part of the requested write-back. Thereafter, the entry can be written to load cache 103b in the same clock cycle. In one embodiment, when the entry from store coalescing cache 103a is in the queue to be written to L2 cache 107, the write port of load cache 103b that is under the control of L2 cache 107 is made available for the write from L2 cache 107 to load cache 103b.

Referring again to FIG. 1A, system 101, responsive to a write-back of an entry maintained in store coalescing cache 103a to level two cache 107, directs a writing of the entry to level two cache 107 and to load cache 103b in a single cycle. In one embodiment, system 101 maintains the coherency of store coalescing cache 103a and load cache 103b at the time of write-back. In one embodiment, system 101 can be located in cache controller 107a. In other embodiments, system 101 can be separate from cache controller 107a, but operate cooperatively therewith.

Main memory 111 includes physical addresses that store the information that is copied into cache memory. In one embodiment, when the information that is contained in the physical addresses of main memory that have been cached is changed, the corresponding cached information is updated to reflect the changes made to the information stored in main memory. Also shown in FIG. 1A is system interface 111.

Operation

Figure 1C:
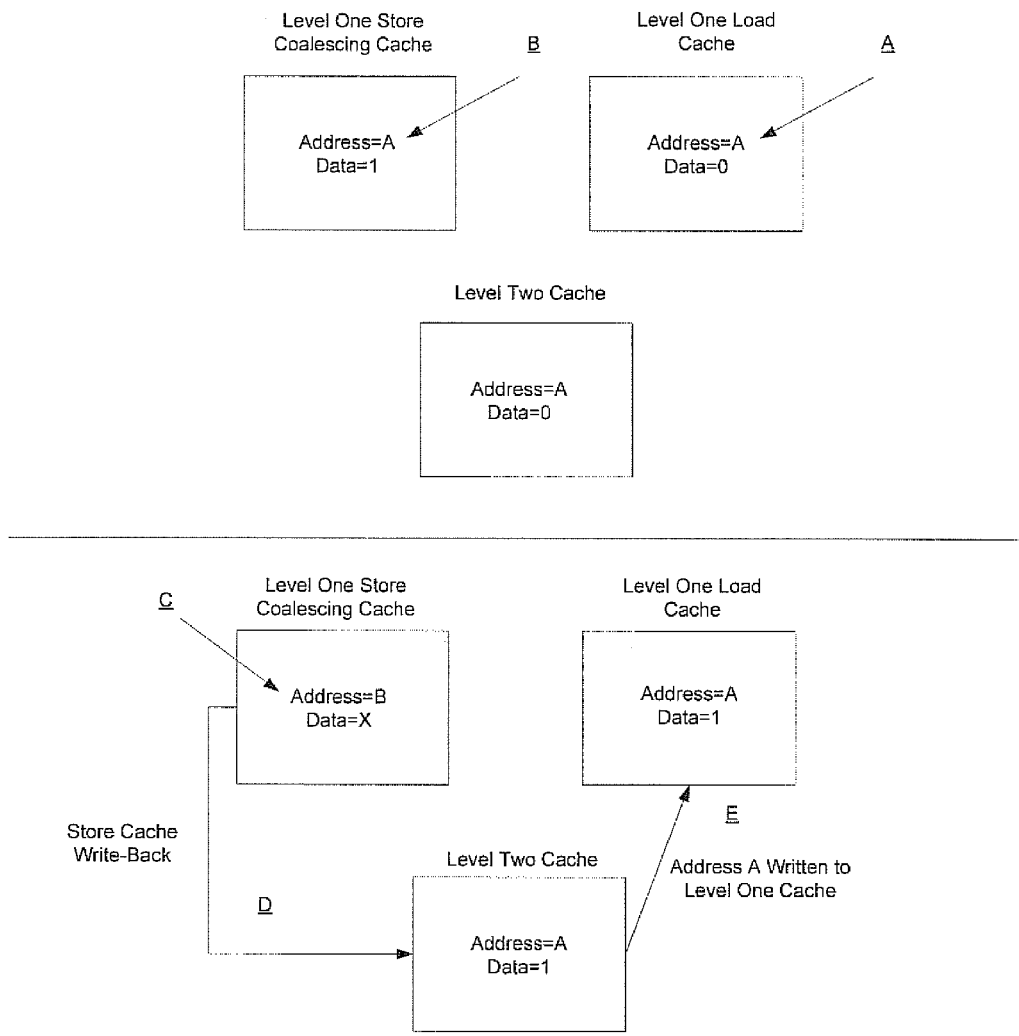
FIG. 1C illustrate operations performed by a system for maintaining the coherency of a store coalescing cache and a load cache at the time of write-back according to one embodiment.

FIG. 1C illustrates operations performed by system 101 for maintaining the coherency of a store coalescing cache and a load cache at the time of write-back according to one embodiment. These operations, which relate to maintaining the coherency of a store coalescing cache and a load cache are illustrated for purposes of clarity and brevity. It should be appreciated that other operations not illustrated by FIG. 1C can be performed in accordance with one embodiment.

Referring to FIG. 1C, at A (e.g., time 0), load A writes A with value 0 into a load cache (e.g., 103b in FIG. 1A). In one embodiment, load A is an instruction to write the data value 0 into an index of a load cache (e.g., 103b in FIG. 1A).

At B (e.g., time 1), store A writes A with value 1 into a store coalescing cache (e.g., 103a in FIG. 1A). In one embodiment, store A is an instruction to write the data value 1 into an index of a store coalescing cache (e.g., 103a in FIG. 1A).

At C (e.g., time 2), store B requests a write-back of A from the store coalescing cache to the L2 cache by requesting that a data of value X corresponding to address B replace the data of value 1 that corresponds to address A that is present in the aforementioned index of the store coalescing cache. In one embodiment, store B is a request to write-back the data value 1 corresponding to address A into an index of the L2 cache (e.g., 107 in FIG. 1A).

At D (e.g., time 3), the L2 cache writes itself for A with data value 1. Because in one embodiment, the L2 cache does not include the contents of store coalescing cache, the entry corresponding to address A is newly written into an index of the L2 cache.

At E (e.g., time 4), the L2 cache also writes the load cache for A with value 1. The addresses and values used in the description of the operation of the embodiment of FIG. 1C are only exemplary and other addresses and values can be involved.

In one embodiment, as is discussed herein, because stores that are received by the store coalescing cache that update the data that is maintained therein may not immediately update the copies of the data that are maintained in the load cache, a copy of the data that is maintained by the load cache can be stale. Consequently, providing the load cache with the most up to date (most recent) version of the data is undertaken such that at the time of write-back, the load cache is cache coherent with the store coalescing cache with respect to the data that is written-back (the data that is removed from the store coalescing cache).

Figure 2:
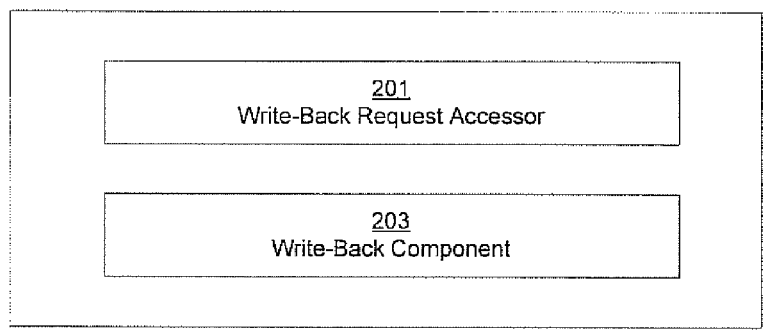
FIG. 2 shows components of a system for maintaining the coherency of a store coalescing cache and a load cache at the time of write-back according to one embodiment.

Components of System for Maintaining Coherency of a Store Coalescing Cache and a Load Cache According to One Embodiment FIG. 2 shows components of a system 101 for maintaining coherency of a store coalescing cache and a load cache at the time of write-back according to one embodiment. In one embodiment, components of system 101 implement an algorithm for maintaining coherency of a store coalescing cache and a load cache. In the FIG. 2 embodiment, components of system 101 include write-back accessor 201 and data writer 203.

Write-back request accessor 201 accesses a write-back request that seeks to replace an entry that is maintained in a level one store coalescing cache (e.g., store coalescing cache 103a in FIG. 1A) with other data. In one embodiment, the write-back request can cause the entry to be written back to a level two cache (e.g., cache 107 in FIG. 1A). In one embodiment, this can occur when there is no space available in the level one store coalescing cache for additional entries.

Write-back component 201, responsive to a write-back or an authorization of a write-back of an entry from a level one store coalescing cache to a level two cache, writes the entry into the level two cache and then writes the entry into the level one load cache (e.g., load cache 103b in FIG. 1A). In one embodiment, the aforementioned writing the entry into the level two cache and the subsequent writing the entry into the level one load cache is executed at the speed of access of the level two cache. In one embodiment, the level two cache controls a port for writing data to the level one load cache, whereas the store coalescing cache does not. As such, in order for the entry that is written back to the level two cache to be written to the level one load cache, the entry is initially written to the level two cache as discussed herein, from whence it can be written to the level one load cache using the level two cache write port.

It should be appreciated that the aforementioned components of system 101 can be implemented in hardware or software or in a combination of both. In one embodiment, components and operations of system 101 can be encompassed by components and operations of one or more computer components or programs (e.g., cache controller 107a in FIG. 1A). In another embodiment, components and operations of system 101 can be separate from the aforementioned one or more computer components or programs but can operate cooperatively with components and operations thereof.

Figure 3:
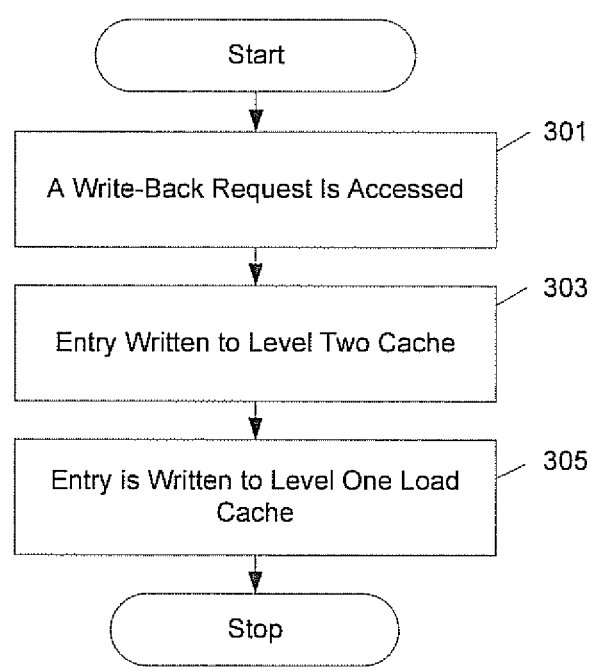
FIG. 3 shows a flowchart of the steps performed in a method for maintaining the coherency of a store coalescing cache and a load cache at the time of write-back according to one embodiment.

Method for Maintaining Coherency of a Store Coalescing Cache and a Load Cache According to One Embodiment FIG. 3 shows a flowchart 300 of the steps performed in a method for maintaining coherency of a store coalescing cache and a load cache at the time of write-back according to one embodiment according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, a write-back request is accessed that seeks to replace an entry that is maintained in a level one store coalescing cache (e.g., store coalescing cache 103a in FIG. 1A) with other data. In one embodiment, the write-back request can cause the entry to be written back to a level two cache (e.g., cache 107 in FIG. 1A). In one embodiment, this can occur when there is no space available in the level one store coalescing cache for additional entries.

At 303, responsive to a write-back of an entry or an authorization of a write-back from a level one store coalescing cache to a level two cache, the entry is written into the level two cache. In one embodiment, the level two cache (e.g., L2 cache 107) does not include the contents of the store coalescing cache or the load cache (e.g., store coalescing cache 103a and load cache 103b), accordingly it must be first written to the level two cache before the load cache can be updated.

At 305, the entry is written into the level one load cache. In one embodiment, the aforementioned writing the entry into the level two cache and the writing the entry into the level one load cache is executed at the speed of access of the level two cache. In one embodiment, the level two cache controls a port for writing data to level one load cache, whereas the level one store coalescing cache does not. As such, in order for the entry that is written back to the level two cache to be written to the level one load cache, the entry is initially written to the level two cache as discussed, from whence it can be written to the level one load cache using the level two cache write port.

With regard to exemplary embodiments thereof, a method for maintaining the coherency of a store coalescing cache and a load cache is disclosed. As a part of the method, responsive to a write-back of an entry from a level one store coalescing cache to a level two cache, the entry is written into the level two cache and into the level one load cache. The writing of the entry into the level two cache and into the level one load cache is executed at the speed of access of the level two cache.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for maintaining the coherency of a store coalescing cache and a load cache, the method comprising:

responsive to a write-back of an entry from a level one store coalescing cache to a level two cache, writing said entry into said level two cache; and responsive to said write-back of said entry from said level one store coalescing cache to said level two cache, writing said entry into a level one load cache, wherein said writing said entry into said level two cache and said writing said entry into said level one load cache are executed at a pipeline speed of access of said level two cache in a single clock cycle and wherein said writing said entry into said level one load cache causes said level one store coalescing cache and said level one load cache to be coherent, wherein said writing said entry into said level one load cache is accommodated by a write port of said level one load cache.

2. The method of claim 1 wherein said write port of said level one load cache is under control of said level two cache.

3. The method of claim 1 wherein said writing said entry into said load cache comprises updating a stale entry in said level one load cache.

4. The method of claim 1, wherein an address associated with said entry has a value associated with it that is different in said level one store coalescing cache than a value associated with a corresponding address in said level one load cache before said write back.

5. The method of claim 1, wherein said entry remains in said store coalescing cache until said entry is written into said level one load cache.

6. A cache system, the cache system comprising:
   a level one cache comprising:
      a store coalescing cache; and
      a load cache;
   a level two cache comprising:
      a cache controller comprising:
         a write-back accessing component for accessing a write-back from a level one store coalescing cache; and
         a writing component for, responsive to a write-back of an entry from a level one store coalescing cache to a level two cache, writing said entry into said level two cache and responsive to said write-back of said entry from said level one store coalescing cache to said level two cache, writing said entry into said level one load cache, wherein said writing said entry into said level two cache and said writing said entry into said level one load cache are executed at a pipeline speed of access of said level two cache in a single clock cycle and wherein said writing said entry into said level one load cache causes said level one store coalescing cache and said level one load cache to be coherent, wherein said writing said entry into said level one load cache is accommodated by a write port of said level one load cache.

7. The cache system of claim 6 wherein said write port of said level one load cache is under control of said level two cache.

8. The cache system of claim 6 wherein said writing said entry into said load cache comprises updating a stale entry in said level one load cache.

9. The cache system of claim 6, wherein an address associated with said entry has a value associated with it that is different in said level one store coalescing cache than a value associated with a corresponding address in said level one load cache before said write back.

10. The cache system of claim 6, wherein said entry remains in said store cache until said entry is written into said level one load cache.

11. A processor, said processor comprising:
   a CPU; and
   a cache system, comprising:
      a level one cache comprising:
         a store coalescing cache; and
         a load cache;
      a level two cache comprising:
         a cache controller comprising:
            a write-back accessing component for accessing a write-back from a level one store coalescing cache to a level two cache; and
            a writing component for, responsive to a write-back of an entry from a level one store coalescing cache to a level two cache, writing said entry into said level two cache and responsive to said write-back of said entry from said level one store coalescing cache to said level two cache, writing said entry into said level one load cache, wherein said writing said entry into said level two cache and said writing said entry into said level one load cache are executed at a pipeline speed of access of said level two cache in a single clock cycle wherein said writing said entry into said level one load cache causes said level one store coalescing cache and said level one load cache to be coherent, wherein said writing said entry into said level one load cache is accommodated by a write port of said level one load cache.

12. The processor of claim 11 wherein said write port of said level one load cache is under a control of said level two cache.

13. The processor of claim 11 wherein said writing said entry into said load cache comprises updating a stale entry in said level one load cache.

14. The processor of claim 11 wherein an address associated with said entry has a value associated with it that is different in said level one store coalescing cache than a value associated with a corresponding address in said level one load cache before said write back.

* * * * *